United States Patent [19]

Fukunaga et al.

[11] Patent Number: 4,826,805
[45] Date of Patent: May 2, 1989

[54] GAS ABSORBER

[75] Inventors: Akira Fukunaga; Hidenobu Arimitsu; Yoshiharu Yasuhara; Toshihiko Shiota, all of Kanagawa, Japan

[73] Assignees: Ebara Research Co., Ltd., Kanagawa; Ebara Corporation, Tokyo, both of Japan

[21] Appl. No.: 105,239

[22] Filed: Oct. 7, 1987

[30] Foreign Application Priority Data

Oct. 7, 1986 [JP] Japan .................................. 61-237003
Aug. 27, 1987 [JP] Japan .................................. 62-211310

[51] Int. Cl.⁴ ...................... B01D 39/00; B01D 53/02; B01J 20/00; B01J 20/26
[52] U.S. Cl. ................................. 502/402; 502/404; 423/240; 55/71; 55/74
[58] Field of Search .................... 502/402, 404; 55/71, 55/74; 423/240 R, 240 S

[56] References Cited

U.S. PATENT DOCUMENTS

| 32,392 | 4/1987 | Clark et al. | 502/402 |
| 1,818,155 | 8/1931 | Oglesby et al. | 55/74 |
| 4,016,242 | 4/1977 | Deitz et al. | 55/74 |

FOREIGN PATENT DOCUMENTS

| 1005285 | 1/1976 | Japan | 55/74 |
| 1005286 | 1/1976 | Japan | 55/74 |
| 0587976 | 1/1978 | U.S.S.R. | 55/71 |
| 0715125 | 2/1980 | U.S.S.R. | 55/71 |
| 1033520 | 8/1983 | U.S.S.R. | 502/404 |
| 1255175 | 9/1986 | U.S.S.R. | 502/404 |

Primary Examiner—Patrick P. Garvin
Assistant Examiner—E. D. Irzinski
Attorney, Agent, or Firm—Wenderoth, Lind & Ponack

[57] ABSTRACT

An absorber that is capable of efficient absorption of $SiF_4$ and/or $BCl_3$ present in gases that are discharged from semiconductor fabrication plants, ceramic producing plants and other plants is disclosed. The absorber contains an alkali agent, water and a superabsorbent as effective components. This absorber, when used to treat an effluent gas, attains as high reaction rate as in the conventional wet process and can be handled as easily as in the dry process.

11 Claims, 1 Drawing Sheet

GAS ABSORBER

BACKGROUND ART

1. Field of Invention

The present invention relates to an absorber that is capable of efficient absorption of SiF$_4$ and/or BCl$_3$ present in gases that are discharged from semiconductor fabrication plants, ceramic producing plants and other facilities.

2. Prior Art

Gaseous SiF$_4$ and BCl$_3$ are discharged, in small amounts though, from the steps of IC or LSI fabrication or from the sintering step of ceramic production. These gases are injurious to the human body and are currently removed by either the wet or dry absorption process. The wet method involves the use of water or an aqueous alkali solution with which the effluent gas is treated so as to absorb the injurious components. This method is so popular in the art of emission treatment that it can be implemented quite easily. In addition, this method is very efficient since SiF$_4$ and BCl$_3$ gases are highly reactive with water. Rapid absorption of these gases by water is illustrated by the following reaction schemes:

$$SiF_4 + 2H_2O \rightarrow 4HF + SiO_2 \quad (1\text{-}1)$$

$$2HF + SiF_4 \rightarrow H_2SiF_6 \quad (1\text{-}2)$$

$$BCl_3 + 3H_2O \rightarrow H_3BO_3 + 3HCl \quad (2\text{-}1)$$

However, the wet process has the following disadvantages: it involves high initial and running costs not only for circulating the absorbing liquor but also for controlling the pH and the concentration of the resulting salts; the impurities in the emission will react with the absorbing liquor to form solid matter that either clogs the equipment or increases the concentrations of salts in the absorbing liquor, which leads to scaling or retardation of the intended reactions; and it is necessary to treat the liquid waste resulting from the wet process.

The dry process has been proposed with a view to solving these problems of the wet process. The dry process is classified as the full-dry type which employs a solid alkali agent per se as an adsorbent (see Unexamined Published Japanese patent application No. 61619/1986) or as the semi-dry type which employs a diatomaceous earth carrier impregnated with an aqueous alkali solution (see Unexamined Published Japanese patent application Nos. 128146/1983 and 187335/1985). In either type of the dry process, an adsorbent is packed in a column and the intended treatment can be accomplished more easily and with smaller equipment required in comparison with the wet process. However, the reaction occurring in the full-dry method is so slow compared with the wet process that an unduly large amount of adsorbent must be packed in the column. Furthermore, the water that forms as a result of reaction will sometimes cause agglomeration of the particles of the adsorbent, which leads to an increased resistance to gas permeation. In these respects, the semi-dry method seems to be more efficient but the water retention of the carrier such as diatomaceous earth is not large enough to allow for the increase in the contents of water and an alkali agent that can be incorporated in unit volume of the adsorbent, and this eventually leads to an increased use of the latter. In addition, the water formed as a result of reaction cannot be absorbed rapidly enough to render the semi-dry method completely free from the problem of increased resistance to gas permeation.

SUMMARY OF THE INVENTION

An object, therefore, of the present invention is to provide an absorber that can be used to render SiF$_4$ and/or BCl$_3$ gases harmless by the dry process.

Another object of the present invention is to provide an absorber that attains as high reaction rate as in the wet process and which can be handled as easily as in the dry process.

As a result of intensive studies conducted in order to attain these objects, the present inventors found that the desired absorber could be obtained from the combination of an alkali agent, water and a superabsorbent used as effective components. The present invention has been accomplished on the basis of this finding.

The present invention, therefore, provides an absorber of SiF$_4$ and/or BCl$_3$ that contains an alkali agent, water and a superabsorbent as effective components.

DETAILED DESCRIPTION OF THE INVENTION

Figure 1:
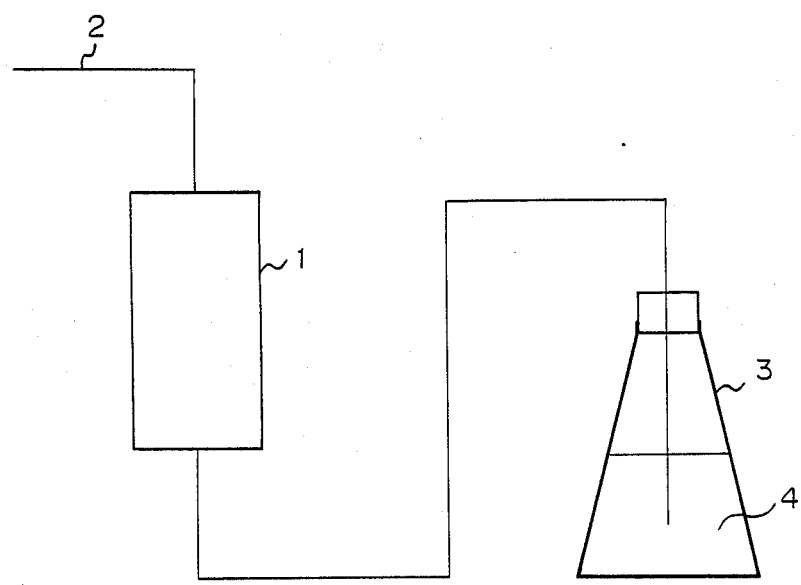
FIG. 1 is a sketch of an apparatus used to test the performance of a gas absorber.

The alkali agent that can be used in the present invention may be a hydroxide of an alkali metal or an alkaline earth metal, or an oxide of an alkaline earth metal such as CaO. The alkali agent may be in the form of a powder or particles.

The superabsorbent may be any high-molecular compound that has ionizable groups and which is lightly cross-linked to become insoluble. Stated more specifically, the superabsorbent may be selected from among cellulosic polymers, hydrophilic acrylic polymers, vinyl alcohol based polymers, and starch based polymers.

The absorber of the present invention may be employed in a variety of forms. For example, an aqueous solution or suspension of the alkali agent is absorbed in or mixed with the superabsorbent, which then is shaped into a particulate form. Alternatively, a particulate alkali agent may be mixed with a particulate superabsorbent into which water has been absorbed, or with a superabsorbent powder into which water has been absorbed and which is subsequently shaped into a particulate form, and the resulting mixture is packed in an absorbing column. From the viewpoint of manufacture and handling of the absorber, it is preferable to permit gases of interest to flow through beds of first and second layers, the first layer being composed of a particulate superabsorbent into which water has been absorbed or a superabsorbent powder into which water has been absorbed and which is subsequently shaped into a particulate form and the second layer composed of a particulate alkali agent.

If the absorber of the present invention is employed in the treatment of effluent gas, the advantages of both the wet and dry processes can be attained. At the first stage, water in the superabsorbent enables SiF$_4$ and BCl$_3$ in the gas to be rapidly decomposed through the reactions that are entirely the same as what occur in the wet process [Eqs. (1-1) and (2-1)]. While various reaction products occur, SiO$_2$ and H$_3$BO$_3$ are entrapped as solid matter in the absorber layer. Gaseous reaction products, i.e., HF and HCl, are neutralized with the alkali agent to form salts as a result of reactions represented by Eqs. (1-3) and (2-2), the salts being fixed in the absorber layer. The liquid reaction product, $H_2SiF_6$, is either absorbed by the superabsorbent or fixed in the absorber layer in the form of a salt that has formed as a result of reaction with the alkali agent according to Eq. (1-4). After having passed through these stages of reaction, $SiF_4$ and $BCl_3$ in the effluent gas are fixed in the absorber layer with the result that the gas is rendered harmless:

$$Ca(OH)_2 + 2HF \rightarrow CaF_2 + 2H_2O \quad (1\text{-}3)$$

$$Ca(OH)_2 + H_2SiF_6 \rightarrow CaSiF_6 + 2H_2O \quad (1\text{-}4)$$

$$Ca(OH)_2 + 2HCl \rightarrow CaCl_2 + 2H_2O \quad (2\text{-}2)$$

The superabsorbent used in the present invention has the ability to retain and absorb more water than the conventionally used diatomaceous earth. Even if the superabsorbent into which water has been absorbed is used in combination with a particulate alkali agent, the latter will not be dissolved in water. As a further advantage, this superabsorbent is capable of absorbing a much greater amount of an alkali solution or suspension than is possible with the conventional diatomaceous earth.

As the reaction proceeds through various stages, the water that has been absorbed in the superabsorbent is consumed to make the superabsorbent smaller in volume, so that the superabsorbent packed in an absorbing column is capable of retaining the initial level of gas permeability until the end of the absorbing operation. Even if solid matter forms as a result of reaction with water, it can be retained within the superabsorbent and this effect, combined with the already mentioned decrease in the volume of the superabsorbent, will prevent not only clogging of the column but also the backflow of the fine dust of reaction products toward the gas supply end or its discharge out of the system. Because of these features, the gas coming out of the column is highly clean.

An additional advantage that results from the use of a particulate alkali agent and superabsorbent is that the pressure loss that occurs during packing of the column can be minimized. If the size of the particles is excessive, the area of contact with the feed gas is decreased to lower the efficiency of operation. The particles of the alkali agent or superabsorbent are preferably of a size between about 0.5 and 3 mm.

The greater the amount of water retained in the superabsorbent, the more $SiF_4$ and $BCl_3$ that can be absorbed by the superabsorbent. On the other hand, the resistance to gas permeation increases with the absorption of these gases. Therefore, the weight ratio of water to the superabsorbent is generally in the range of 0.5–5, preferably 0.8–2.5. If this range is met, the superabsorbent still has its water-absorbing ability left, so that it is capable of immediately absorbing the water that results from the neutralization reaction, with the attendant advantage that the increase in the resistance to gas permeation due to moisture can be avoided.

As described above, various advantages will result if a particulate alkali agent is combined with a water-impregnated particulate superabsorbent or if an alkali solution or suspension is impregnated in a superabsorbent.

The proportions of the alkali agent and the superabsorbent can be appropriately determined on the basis of such factors as the particle sizes of the alkali agent and the superabsorbent, the operating condition (e.g., feed gas flow rate), differential pressure and the size of equipment.

The following examples are given for the purpose of further illustrating the present invention but are in no sense to be taken as limiting.

EXAMPLE 1

Two conventional absorbers (i.e., solid alkali agent and impregnated type alkali agent) and a sample of the absorber of the present invention were prepared in accordance with the formulations shown below. A hundred grams of each of the absorbers was packed in a column 1 (40 mm$^\phi$) in an experimental apparatus of the type shown in FIG. 1. A gaseous mixture of 20% $SiF_4$ and 80% $N_2$ was supplied in a downward stream into the column 1 through a feed pipe 2 and the treated gas was fed into a flask 3 provided at the exit end of the column 1. The amount of $SiF_4$ that had been absorbed in the column before water 4 in the flask containing methyl red turned red, and the resistance to gas permeation at that time were measured. The results are summarized in Table 1.

Solid alkali agent: a commercial product of slaked lime particles with an approximate size of 1 mm;

Impregnated type alkali agent: 70 g of granulated diatomaceous earth impregnated with 30 g of 10% caustic soda;

Particulate alkali agent combined with water-containing particulate superabsorbent: 50 g of particulate slaked lime (about 1 mm in size) mixed uniformly with 20 g of pellets (1×2×3 mm) of polyvinyl alcohol resin containing 30 g of water.

TABLE 1

| Absorber | Absorption of $SiF_4$ (Nl/kg) | Resistance to gas permeation* (mm $H_2O$) |
|---|---|---|
| Solid alkali agent | 61 | 160 |
| Impregnated type alkali agent | 13 | 20 |
| Combination of particulate alkali agent with superabsorbent | 7 | 25 |

*Measured for a linear speed of 0.5 cm/sec in column 1.

As Table 1 shows, the absorber of the present invention which contained one half the amount of alkali used in the conventional solid alkali agent absorbed more $SiF_4$ and yet produced a much lower resistance to gas permeation. This is because the superabsorbent served to retain high gas permeability while $SiF_4$ was effectively absorbed by reaction with water and the alkali. The impregnated type alkali agent could successfully be used without causing a substantial increase in the resistance to gas permeation but because of the low absolute value of the alkali content, it was not capable of absorbing a satisfactory amount of $SiF_4$. The alkali concentration could not be increased without dissolving the diatomaceous earth. According to the present invention, the alkali content can be sufficiently increased to achieve effective absorption of $SiF_4$.

EXAMPLE 2

Using the same type of experimental apparatus as employed in Example 1, an absorption experiment was conducted on a gaseous mixture of 5% $SiF_4$ and 95% $N_2$ as in Example 1 except that the absorbers were replaced by those having the following formulations. The results are summarized in Table 2.

Absorber 1: a bed of soda lime (50 g; particle size, ca. 2 mm) overlaid with a layer of polyvinyl alcohol based superabsorbent (30 g) impregnated with water (20 g);

Absorber 2: same as absorber 1 except that the amounts of the superabsorbent and water were changed to 20 g and 30 g, respectively;

Absorber 3: same as absorber 1 except that the amounts of the superabsorbent and water were changed to 15 g and 35 g, respectively.

TABLE 2

| Absorber | Absorption of $SiF_4$ (Nl/kg) | Resistance to gas permeation (mm $H_2O$) |
|---|---|---|
| 1 | 40 | 2 |
| 2 | 68 | 31 |
| 3 | 133 | 450 |

According to Table 2, the amount of $SiF_4$ absorbed was substantially proportional to the content of water in the superabsorbent and this indicates that the reaction between water and $SiF_4$ [Eq. (1-1)] is a rate-limiting factor for the process of $SiF_4$ absorption. It is also evident from Table 2 that impregnating the superabsorbent with water in an amount exceeding a certain level is not preferred since an excessive water content causes a rapid increase in the resistance to gas permeation.

EXAMPLES 3-5

Using the same type of experimental apparatus as employed in Example 1, an absorption experiment was conducted on a feed gas having the same composition as what was used in Example 1, except that the absorbers were replaced by those having the following formulations. The results are summarized in Table 3.

Absorber A: 5 g of a cellulosic superabsorbent powder into which 50 g of water was absorbed was mixed with 45 g of a magnesium hydroxide powder, and the resulting mixture was granulated into particles of 2-3 mm in size;

Absorber B: a bed of particulate slaked lime (50 g; size: 1 mm) overlaid with 25 g of a PVC resin compound (particle size: ca. 3 mm) in which fine particles of an acrylic acid based superabsorbent were dispersed and into which 25 g of water was absorbed;

Absorber C: 50 g of a polyvinyl alcohol based superabsorbent (particle size: ca. 2 mm) into which 50 g of a 10% sodium hydroxide solution was absorbed.

TABLE 3

| Example No. | Absorber | Absorption of $SiF_4$ (Nl/kg) | Resistance to gas permeation (mm $H_2O$) |
|---|---|---|---|
| 3 | A | 93 | 370 |
| 4 | B | 77 | 16 |
| 5 | C | 43 | 21 |

EXAMPLES 6-8

An absorption experiment was conducted as in Examples 3-5, except that the feed gas was a mixture of 10% $BCl_3$ and 90% $N_2$. The results are shown in Table 4.

TABLE 4

| Example No. | Absorber | Absorption of $BCl_3$ (Nl/kg) | Resistance to gas permeation (mm $H_2O$) |
|---|---|---|---|
| 6 | A | 22 | 180 |
| 7 | B | 13 | 23 |
| 8 | C | 5.3 | 12 |

What is claimed is:

1. An absorber for $SiF_4$, $BCl_3$ and mixtures thereof which comprises a mixture of an alkali agent in particulate form, water and a superabsorbent in particulate form, said super absorbent being selected from the group consisting of cellulosic polymers, hydrophilic acrylic polymers, vinyl alcohol based polymers and starch based polymers, wherein the weight ratio of water to the superabsorbent is in the range of 0.5 to 5.

2. An absorber according to claim 1 in which said mixture of an alkali agent in particulate form and a superabsorbent in particulate form has a particle size in the range of 0.5 to 3 mm.

3. An absorber according to claim 1 wherein 0.8 to 2.5 parts by weight of water is used as compared with one part by weight of the superabsorbent.

4. An absorber according to claim 1 wherein the alkali agent is a hydroxide of an alkali metal or an alkaline earth metal or an oxide of an alkaline earth metal.

5. An absorber according to claim 1 in which the superabsorbent is a hydrophilic acrylic polymer.

6. An absorber according to claim 1 in which the superabsorbent is a vinyl alcohol.

7. An absorber according to claim 1 in which the superabsorbent is a starch based polymer.

8. An absorber for $SiF_4$, $BCl_3$ gases and mixtures thereof which comprises a bed of layers in which said gases can pass therethrough comprising a first layer of a particulate water-containing superabsorbent disposed at the gas feed end such that the $SiF_4$ and $BCl_3$ gases first pass through this layer and a second layer of a particulate alkali agent disposed at the gas exit end of said bed and in which layer the said gases pass through, after leaving the first layer, said superabsorbent being selected from the group consisting of cellulosic polymers, hydrophilic acrylic polymers, vinyl alcohol based polymers and starch based polymers, wherein the weight ratio of water to the superabsorbent is in the range of 0.5 to 5.

9. An absorber according to claim 8 in which said mixture of an alkali agent in particulate form and a superabsorbent in particulate form has a particle size in the range of 0.5 to 3 mm.

10. An absorber according to claim 8, wherein 0.8 to 2.5 parts by weight of water is used as compared with one part by weight of the superabsorbent.

11. An absorber according to claim 8 wherein the alkali agent is a hydroxide of an alkali metal or an alkaline earth metal or an oxide of an alkaline earth metal.

* * * * *